United States Patent
Basu (10) Patent No.: US 10,264,263 B2
(45) Date of Patent: Apr. 16, 2019

(54) SYSTEMS AND METHODS FOR COMPRESSING IMAGE DATA GENERATED BY A COMPUTED TOMOGRAPHY (CT) IMAGING SYSTEM

(71) Applicant: Morpho Detection, LLC, Newark, CA (US)

(72) Inventor: Samit Kumar Basu, Fremont, CA (US)

(73) Assignee: MORPHO DETECTION, LLC, Newark, CA (US)

( * ) Notice: Subject to any disclaimer, the term of this patent is extended or adjusted under 35 U.S.C. 154(b) by 282 days.

(21) Appl. No.: 15/202,929

(22) Filed: Jul. 6, 2016

(65) Prior Publication Data
US 2018/0014016 A1 Jan. 11, 2018

(51) Int. Cl.
| | |
|---|---|
| G06K 9/46 | (2006.01) |
| H04N 19/13 | (2014.01) |
| G01V 5/00 | (2006.01) |
| G06T 9/00 | (2006.01) |
| H04N 19/503 | (2014.01) |
| H04N 19/593 | (2014.01) |

(Continued)

(52) U.S. Cl.
CPC ............ *H04N 19/13* (2014.11); *G01V 5/005* (2013.01); *G06T 9/004* (2013.01); *H04N 19/126* (2014.11); *H04N 19/172* (2014.11); *H04N 19/503* (2014.11); *H04N 19/593* (2014.11); *H04N 19/132* (2014.11); *H04N 19/91* (2014.11)

(58) Field of Classification Search
None
See application file for complete search history.

(56) References Cited

U.S. PATENT DOCUMENTS 5,841,473 A 11/1998 Chui et al.
5,949,842 A 9/1999 Schafer et al.
(Continued)

FOREIGN PATENT DOCUMENTS

WO 2002028109 A1 4/2002

OTHER PUBLICATIONS

Vishram Nandedkar et al: "Lossless volumetric medical image compression with progressive multi-planar reformatting using 3-D DPCM", National Conference on Image Processing, Bangalore, India, Mar. 23, 2005 (Mar. 23, 2005), XP055394647.

(Continued)

*Primary Examiner* — Sean M Conner
(74) *Attorney, Agent, or Firm* — Armstrong Teasdale LLP (57) ABSTRACT

A compression device for compressing image data generated by a computed tomography (CT) imaging system is described herein. The compression device is configured to compress the image data by implementing a method including receiving image data from the CT imaging system and requantizing the image data in a square root domain. The method further includes identifying a group of projections (GOP) in the image data, including a first projection and a plurality of subsequent projections, and performing spatial-delta encoding on the first projection and temporal-delta encoding on each of the plurality of subsequent projections. The method also includes identifying a signed value in the GOP, and converting the signed value to an unsigned value. The method further includes entropy coding the image data in the GOP, and packetizing the GOP for transmission or storage.

17 Claims, 5 Drawing Sheets

(51) Int. Cl.
*H04N 19/126* (2014.01)
*H04N 19/172* (2014.01)
*H04N 19/91* (2014.01)
*H04N 19/132* (2014.01)

(56) References Cited

U.S. PATENT DOCUMENTS

| | | | |
|---|---|---|---|
| 6,014,468 | A | 1/2000 | McCarthy et al. |
| 6,396,422 | B1 | 5/2002 | Barkan |
| 6,907,081 | B2 | 6/2005 | Mantchala et al. |
| 8,872,946 | B2 | 10/2014 | Cote et al. |
| 9,380,312 | B2 | 6/2016 | Cote et al. |
| 2002/0080052 | A1* | 6/2002 | Gobert ............... H04N 19/61 341/63 |
| 2015/0222921 | A1 | 8/2015 | Sato et al. |
| 2017/0237996 | A1* | 8/2017 | Schneider ............ H04N 19/184 382/168 |

OTHER PUBLICATIONS

Sanchez Victor et al: "Lossless compression of medical images based on HEVC intra coding", IEEE International Conference on Acoustics, Speech and Signal Processing (ICASSP), May 4, 2014 (May 4, 2014), pp. 6622-6626, XP032616688, DOI: 10.1109/ICASSP.2014.6854881 [retrieved on Jul. 11, 2014].

Qi X et al: "A progressive transmission capable diagnostically lossless compression scheme for 3D medical image sets", Information Sciences, Amsterdam, vol. 175, No. 3, Oct. 14, 2005 (Oct. 14, 2005), pp. 217-243, XP027629940, ISSN: 0020-0255 [retrieved on Oct. 14, 2005].

Philipsa W et al: "State-of-the-art techniques for lossless compression of 3D medical image sets", Computerized Medical Imaging and Graph, vol. 25, Jan. 1, 2001 (Jan. 1, 2001), pp. 173-185, XP007916939, ISSN: 0895-6111.

Oguz S H et al: "Motion-compensated prediction based algorithm for medical image sequence compression", Signal Processing. Image Communication, vol. 7, No. 3, Sep. 1, 1995 (Sep. 1, 1995), pp. 225-230, KP004047105, ISSN: 0923-5965, DOI: 10.1016/0923-5965(95)00027-T.

Bieniosek et al: "A square root analog to digital converter to optimally convert photonic signals for computed tomography", Department of Electrical and Computer Science, MIT, Jun. 1, 2010 (Jun. 1, 2010), pp. 1-82, XP008140227, Retrieved from the Internet: URL:http://dspace.mit.edu/handle/1721.1/62309 [retrieved on Jul. 1, 2010].

Anonymous: "Golomb coding—Wikipedia, the free encyclopedia", Wikipedia, Apr. 6, 2012 (Apr. 6, 2012), pp. 1-5, XP055244599, Retrieved from the Internet: URL:http://web.archive.org/web/20120406011544/https://en.wikipedia.org/wiki/Golomb_coding [retrieved on Jan. 1, 2013].

Andre Mouton et al: "An evaluation of image denoising techniques applied to CT baggage screening imagery", IEEE International Conference on Industrial Technology (ICIT), Feb. 25, 2013 (Feb. 25, 2013), pp. 1063-1068, XP032377236, DOI: 10.1109/ICIT.2013.6505819 ISBN: 978-1-4673-4567-5.

Extended European Search Report, Application No. 17001155.5-1905, dated Jul. 17, 2017, 14 pps.

* cited by examiner

SYSTEMS AND METHODS FOR COMPRESSING IMAGE DATA GENERATED BY A COMPUTED TOMOGRAPHY (CT) IMAGING SYSTEM

BACKGROUND

The embodiments described herein relate generally to image processing, and more particularly, to compressing image data from a computed tomography (CT) imaging system.

Some known computed tomography (CT) imaging systems, especially luggage scanning CT imaging systems, generate large volumes of image data during normal operation (upwards of 1 GB of storage per piece of luggage). Typically, the image information content captured for an imaged bag remains relatively low because the scanned luggage and related objects are generally simple in shape and form and the field of view is typically much larger than the objects being scanned. However, luggage is continuously captured in an airport security line, for example, conventional imaging systems generate substantial quantities of uncompressed image data that requires a high bandwidth transmission line to facilitate adequate data transfer within the imaging system. As a result, the components of these conventional imaging systems must be configured to handle, to transfer, and to store these large amounts of captured image data. For example, data transmission components, such as data buses, must be configured with a high bandwidth to manage the volume of image data (upwards of 1 GB per second).

BRIEF SUMMARY

In one aspect, a compression device for compressing raw image data generated by a computed tomography (CT) imaging system is provided. The compression device includes a processor coupled to a memory and to the CT imaging system. The compression device is configured to compress image data by receiving raw image data from the CT imaging system and requantizing the raw image data in a square root domain. The compression device is further configured to compress the image data by identifying a group of projections in the requantized image data, including a first projection and a plurality of subsequent projections, performing spatial-delta encoding on the first projection, and performing temporal-delta encoding on each of the plurality of subsequent projections with respect to at least one of the projections in the group of projections. The compression device is also configured to compress the image data by identifying at least one signed value in the delta-encoded group of projections, and converting the at least one signed value to an unsigned value. The compression device is still further configured to compress the image data by entropy coding the sign-converted image data in the group of projections, and packetizing the entropy-coded group of projections for at least one of transmission and storage.

In another aspect, a computer-implemented method for compressing raw image data generated by a computed tomography (CT) imaging system is provided. The method is implemented using a compression device including a processor coupled to a memory and to the CT imaging system. The method includes receiving raw image data from the CT imaging system and requantizing the raw image data in a square root domain. The method also includes identifying a group of projections in the requantized image data, including a first projection and a plurality of subsequent projections, performing spatial-delta encoding on the first projection, and performing temporal-delta encoding on each of the plurality of subsequent projections with respect to at least one of the projections in the group of projections. The method further includes identifying at least one signed value in the delta-encoded group of projections, and converting the at least one signed value to an unsigned value. The method still further includes entropy coding the sign-converted image data in the group of projections, and packetizing the entropy-coded group of projections for at least one of transmission and storage.

In yet another aspect, at least one non-transitory computer-readable storage media having computer-executable instructions embodied thereon is provided. When executed by at least one processor, the computer-executable instructions cause the processor to receive raw image data from the CT imaging system, and requantize the raw image data in a square root domain. The computer-executable instructions also cause the processor to identify a group of projections in the requantized image data, including a first projection and a plurality of subsequent projections, perform spatial-delta encoding on the first projection, and perform temporal-delta encoding on each of the plurality of subsequent projections with respect to at least one of the projections in the group of projections. The computer-executable instructions further cause the processor to identify at least one signed value in the delta-encoded group of projections, and convert the at least one signed value to an unsigned value. The computer-executable instructions still further cause the processor to entropy code the sign-converted image data in the group of projections, and packetize the entropy-coded group of projections for at least one of transmission and storage.

BRIEF DESCRIPTION OF THE DRAWINGS

FIGS. 1-5 show exemplary embodiments of the systems and methods described herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations are combined and interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, "instantaneous" or "real-time" refers to outcomes occurring at a substantially short period after an input. The time period is a result of the capability of compression device implementing processing of raw image data to generate compressed image data. Events occurring instantaneously or in real-time occur without substantial intentional delay or latency. In the embodiments described herein, these activities and events occur substantially instantaneously.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

The systems and methods described herein facilitate real-time compression of raw image data (i.e., raw data images) generated by a computed tomography (CT) imaging system that includes at least a CT imaging scanner and a compression device. The compression device implements a non-computationally intensive compression algorithm configured to compress raw image data captured by the CT imaging system using a reversible (i.e., de-compressible) technique that does not substantially degrade the image quality. Accordingly, the compression device, as described herein, allows for faster raw image data processing speeds, lowered bandwidth usage between different components and devices within the CT imaging system, and less memory and storage usage required during real-time image data compression operation.

The subject matter described herein includes a compression device for compressing image data generated by a CT imaging scanner. The compression device includes a processor coupled to a memory and to the CT imaging system. The compression device is configured to compress the raw image data by receiving the raw image data from the CT imaging scanner, requantizing the image data in a square root domain, identifying a group of projections in the image data, including a first projection and a plurality of subsequent projections, performing spatial-delta encoding on the first projection, performing delta encoding on each of the subsequent projections with respect to the first projection, identifying at least one signed value in the group of projections and converting the at least one signed value to an unsigned value, entropy coding the group of projections, and packetizing the entropy-coded group of projections for transmission or storage.

In some implementations, the compression device is further configured to compress the raw image data while the raw image data is being generated by the CT imaging scanner. In some implementations, the compression device is further configured to receive the image data by receiving multi-slice helical image data. In some implementations, the compression device is further configured to perform empty column suppression on the image data.

In some implementations, the compression device is further configured to compare at least one value in the image data to a predefined threshold value, determine that the at least one value is less than the predefined threshold value, and in response to determining that the at least one value is less than the predefined threshold value, remove the at least one value from the image data.

In some implementations, the compression device is further configured to perform zero column suppression on the image data. In some implementations, the compression device is further configured to normalize the image data by linearizing a response of a detector in the computed tomography imaging system using at least two values from the detector.

Figure 1:
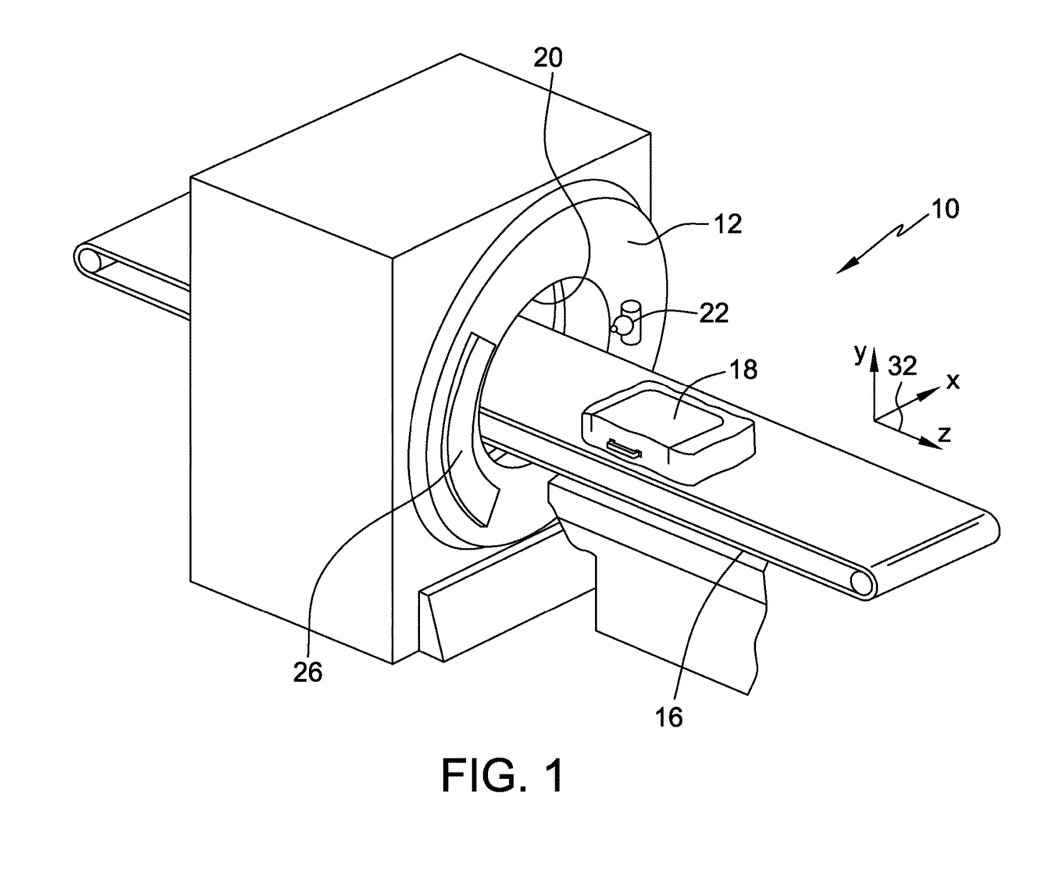
FIG. 1 is a perspective view of an exemplary CT imaging system.
Figure 2:
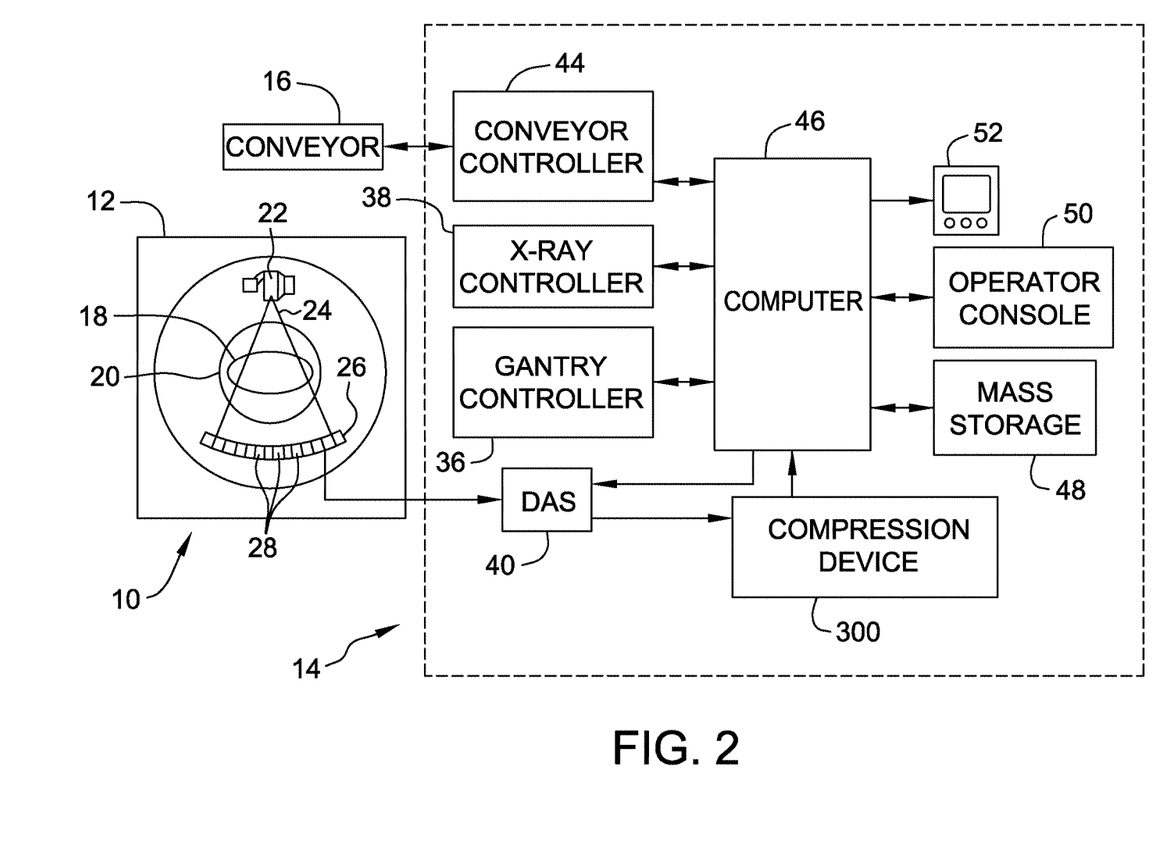
FIG. 2 is a schematic diagram of the CT imaging system shown in FIG. 1.

Referring now to FIGS. 1 and 2, a computed tomography (CT) imaging system 10 is shown. CT imaging system 10 is shown having a gantry 12, which is representative of a CT scanner, a control system 14, and a motorized conveyor belt 16 for positioning an object 18, such as a piece of luggage, in a gantry opening 20 defined through gantry 12. Gantry 12 includes an x-ray source 22 that projects a fan beam of x-rays 24 toward a detector array 26 on the opposite side of gantry 12. Detector array 26 is formed by detector elements 28, which are radiation detectors that each produce a signal having a magnitude that represents and is dependent on the intensity of the attenuated x-ray beam after it has passed through object 18 being imaged. During a helical scan that acquires x-ray projection data, gantry 12 along with the x-ray source 22 and detector array 26 rotate within an x-y plane and around object 18 about a center of rotation, while object 18 is moved through gantry 12 in a z-direction 32 perpendicular to the x-y plane of rotation. In the exemplary embodiment, detector array 26 includes a plurality of detector rings each having a plurality of detector elements 28, the detector rings having an angular configuration corresponding to x-ray source 22.

Gantry 12 and x-ray source 22 are controlled by control system 14, which includes a gantry controller 36, an x-ray controller 38, a data acquisition system (DAS) 40, a compression device 300, a conveyor controller 44, a computer 46, a mass storage-system 48, an operator console 50, and a display device 52. Gantry controller 36 controls the rotational speed and position of gantry 12, while x-ray controller 38 provides power and timing signals to x-ray source 22, and data acquisition system 40 acquires analog data from detector elements 28 and converts the data to digital form for subsequent processing. Compression device 300, as described in more detail below, compresses raw projection data (i.e., raw data images) for storage or transmission. For some applications, an image reconstructor (not shown) may be utilized. For example, image reconstructor may receive the digitized x-ray data from data acquisition system 40 (or computer 46) and perform preprocessing steps on the digitized x-ray data and an image reconstruction process that involves filtering the projection data using a helical reconstruction algorithm. CT imaging system 10 is described herein with respect to the particular example of luggage scanning (e.g., as part of a security process in an airport, train station, courthouse, or any other type of security checkpoint). It should be understood that CT imaging system 10 may be utilized in other applications as well.

Computer 46 is in communication with the gantry controller 36, x-ray controller 38, and conveyor controller 44 whereby control signals are sent from computer 46 to controllers 36, 38, 44 and information is received from controllers 36, 38, 44 by computer 46. Computer 46 also provides commands and operational parameters to data acquisition system 40 and receives compressed raw image data from compression device 300. The compressed raw image data may be packetized by compression device 300 or computer 46. In turn, the packetized compressed raw image data be stored by computer 46 in mass storage system 48 for subsequent retrieval or may processed for transmission to another device. An operator interfaces with computer 46 through operator console 50, which may include, for example, a keyboard and a graphical pointing device, and receives output, such as control settings and other information, on display device 52. Computer 46 may perform some or all of the compression or other processing steps as an alternative or in addition to the compression steps performed by compression device 300.

Communication between the various system elements of FIG. 2 is depicted by arrowhead lines, which illustrate a means for either signal communication or mechanical operation, depending on the system element involved. Communication amongst and between the various system elements may be obtained through a hardwired or a wireless arrangement. Computer 46 may be a standalone computer or a network computer and may include instructions in a variety of computer languages for use on a variety of computer platforms and under a variety of operating systems. Other examples of computer 46 include a system having a microprocessor, microcontroller or other equivalent processing device capable of executing commands of computer readable data or program for executing a control algorithm. In order to perform the prescribed functions and desired processing, as well as the computations therefore (e.g., the execution of filtered back projection, Fourier analysis algorithm(s), the control processes prescribed herein, and the like), computer 46 may include, but not be limited to, a processor(s), memory, storage, register(s), timing, interrupt (s), communication interfaces, and input/output signal interfaces, as well as combinations including at least one of the foregoing. For example, computer 46 may include input signal filtering to enable accurate sampling and conversion or acquisitions of such signals from communications interfaces. As described above, exemplary embodiments can be implemented through computer-implemented processes and apparatuses for practicing those processes.

Figure 3:
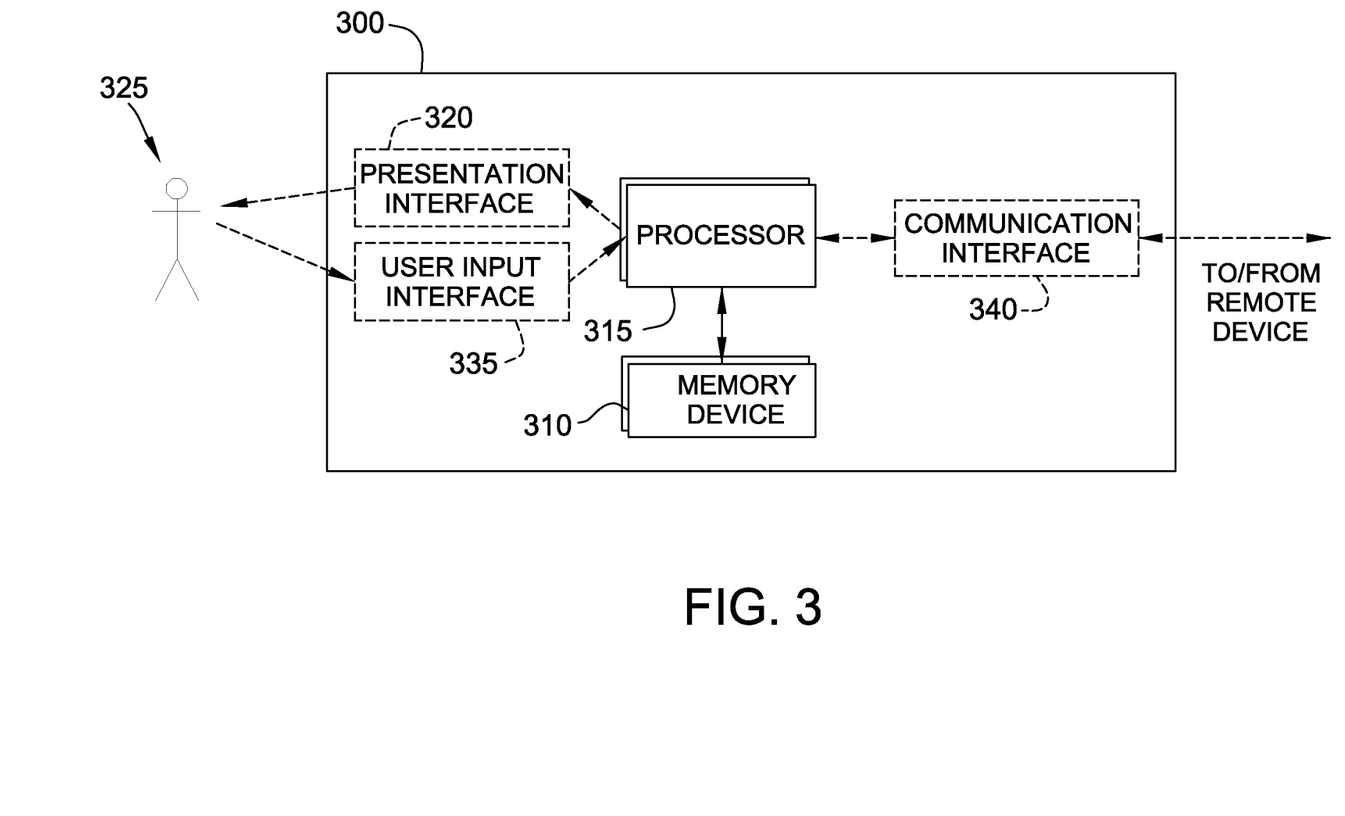
FIG. 3 is a block diagram of an exemplary computing device that may be used with the CT imaging system shown in FIGS. 1 and 2.

FIG. 3 is a block diagram of a compression device 300 that may be used to compress raw data images of scanned or captured objects 18 (for example and without limitation, luggage, bags, plastic bins of loose objects, briefcases, or any other object) generated by a CT imaging system 10, as described herein. Compression device 300 may be implemented as part of control system 14 (for example and without limitation, compression device 300 may replace or be a module disposed within computer 46) or may be a separate computing device in communication with CT imaging system 10 or another imaging system. Compression device 300 includes at least one memory device 310 and a processor 315 that is coupled to memory device 310 for executing instructions. In some embodiments, executable instructions are stored in memory device 310. In the exemplary embodiment, compression device 300 performs one or more operations described herein by programming processor 315. For example, processor 315 may be programmed by encoding an operation as one or more executable instructions and by providing the executable instructions in memory device 310.

Processor 315 may include one or more processing units (e.g., in a multi-core configuration). Further, processor 315 may be implemented using one or more heterogeneous processor systems in which a main processor is present with secondary processors on a single chip. In another illustrative example, processor 315 may be a symmetric multi-processor system containing multiple processors of the same type. Further, processor 315 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), graphics processing units (GPU), and any other circuit capable of executing the functions described herein.

In the exemplary embodiment, memory device 310 is one or more devices that enable information such as executable instructions and/or other data to be stored and retrieved. Memory device 310 may include one or more computer readable media, such as, without limitation, dynamic random access memory (DRAM), static random access memory (SRAM), a solid state disk, and/or a hard disk. Memory device 310 may be configured to store, without limitation, application source code, application object code, source code portions of interest, object code portions of interest, configuration data, execution events and/or any other type of data. Further, reference templates may be stored on memory device 310.

In the exemplary embodiment, compression device 300 includes a presentation interface 320 that is coupled to processor 315. Presentation interface 320 presents information to a user 325. For example, presentation interface 320 may include a display adapter (not shown) that may be coupled to a display device, such as a cathode ray tube (CRT), a liquid crystal display (LCD), an organic LED (OLED) display, and/or an "electronic ink" display. In some embodiments, presentation interface 320 includes one or more display devices.

In the exemplary embodiment, compression device 300 includes a user input interface 335. User input interface 335 is coupled to processor 315 and receives input from user 325. User input interface 335 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 320 and user input interface 335.

As described above, implementation of the compression method includes multiple computational steps. Furthermore, compression device 300 as described herein is configured to receive raw image data and allow for the compression of raw image data by a factor of at least 6:1 and up to 10:1, without affecting image quality of the images reconstructed from the decompression of the compressed image data. Because the loss of information does not affect the quality of the generated images, compressed image data may replace raw image data in subsequent image processing steps performed by CT imaging system 10 without affecting the outcome of those steps or the results of the image processing. Advantageously, compressed image data may also be transmitted to a user (described in further detail below) more quickly by utilizing less bandwidth or may use less storage or memory when stored on a user's computing device.

Figure 4:
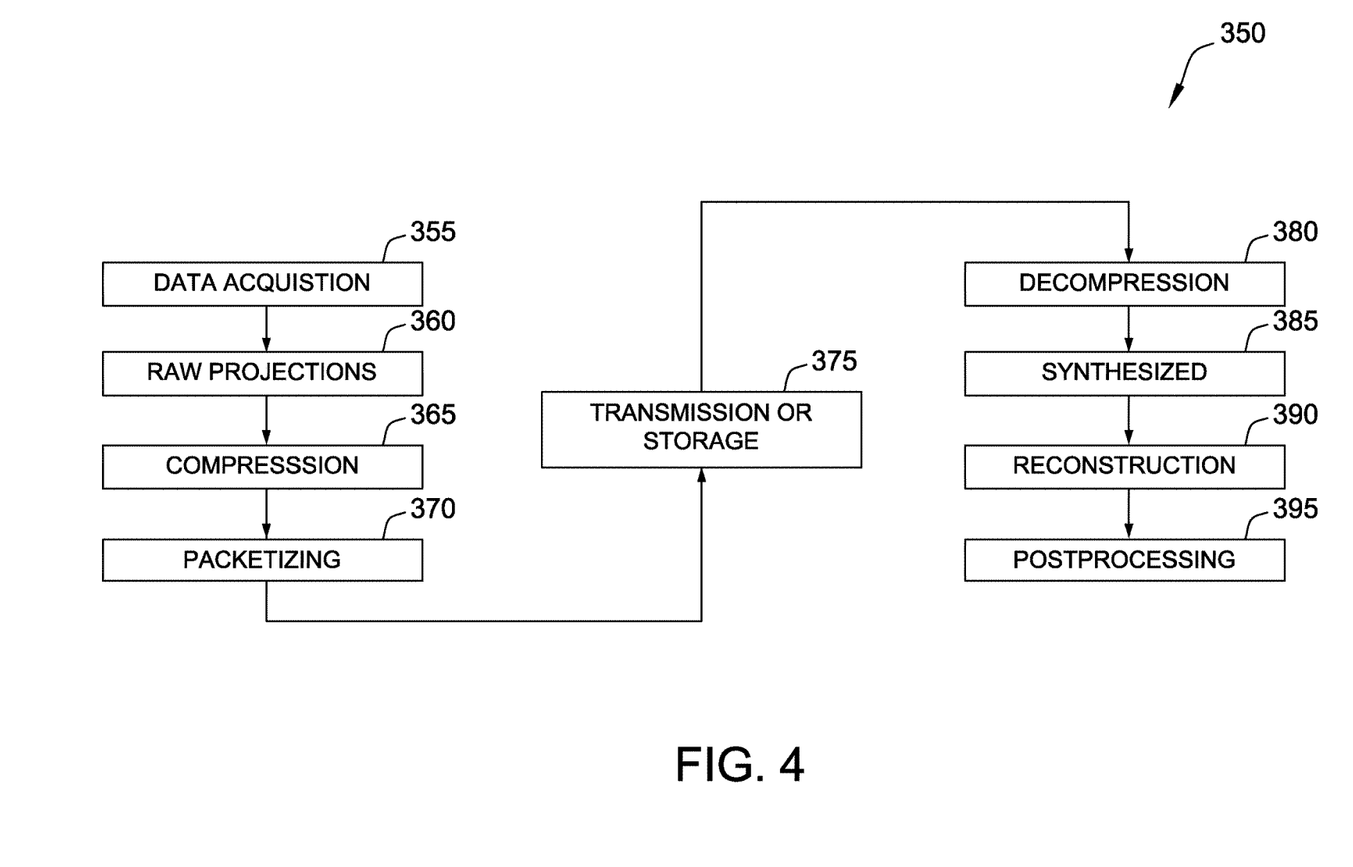
FIG. 4 is a schematic flowchart of an exemplary method of processing and compressing imaging data from a CT imaging system as shown in FIG. 1.

As shown in the example method 350 of FIG. 4, data acquisition system 40 acquires 355 raw image data from captured images of pieces of luggage (for example and without limitation, one or more of items or objects) in a continuous stream of luggage. Generally, data acquisition system 40 acquires in a continuous stream of raw image data of the scanned luggage in any number of formats including raw projection data 360 (i.e., raw data images or helical image data). Compression device 300 may compress 365 the raw data images using any number of suitable compression algorithms and then may packetize 370 the compressed data for transmission or storage 375. When the compressed data is required, compression device 300 (or another device) may decompress 380 the compressed data and synthesize 385 the uncompressed data (i.e., raw data images) into projections. Image reconstructor may utilize a reconstruction transformation 390 or process to generate a series of CT image slices (i.e., CT image slice data). For example and without limitation, various reconstruction transformation algorithms or methods may include ray consistency reconstruction, filtered backprojection, Feldkamp reconstruction algorithm, or phi reconstruction algorithm. Compression device may also perform post-processing 395 steps, in a continuous manner, on reconstructed image data.

As shown in the example embodiment of FIG. 1, CT imaging scanner obtains raw image data from a captured image of a piece of luggage (for example and without limitation, one or more of objects 18) using one or more of detector elements 28. Generally, raw image data of imaged luggage, as shown of FIG. 1, includes relatively low information content because the luggage objects (for example and without limitation, objects 18) being captured or scanned are relatively simple in shape and in terms of required resolution. For example, as shown in FIG. 1, the captured raw image data may include an image that includes object 18 (shown in dotted lines) and a portion of conveyor belt 16 that is not occluded by object 18. In another example, raw image data may include an image that includes objects 18 in addition to object 18 depending on the distances between each item on conveyor belt 16. As a result, because the captured image includes relatively simple objects and large portions of uniform data (i.e., conveyor belt 16), compression device 300 advantageously may compress raw image data into a smaller amount of data, as described in further detail below. After capturing raw image data, CT imaging scanner transmits captured raw image data that includes a data representation of the imaged luggage to compression device 300 for compression processing.

After receiving the raw image data, compression device 300 normalizes raw image data. In some embodiments, compression device 300 linearizes raw image data using at least two measurements, an "offset" measurement and an "air" measurement. The offset measurement is captured in the absence of an image signal and represents a baseline signal of each detector element 28. The offset measure for each channel is typically within a certain range. In the example embodiment, compression device 300 is configured to measure the offset measure for each detector element 28 and to correct the baseline raw image data (i.e., to remove the offset measure from raw image data). An "air measurement" represents the inherent gain in each detector element 28 and is measured by capturing an image with no item (e.g., no luggage) present in the image.

Compression device 300 is configured to "gain correct" raw image data (i.e., to remove the air measure from raw image data). Compression device 300 may perform this normalization step by baseline correcting and gain correcting, then normalizing the "corrected" image data such that the normalized image data is within the range of [0,1]. The value of zero (0) corresponds to the offset measurement (no image signal), and the value of one (1) corresponds to the air measurement (full signal). Normalization is performed using the offset and air measurements (collectively "calibration vectors") corresponding to time and/or environmental conditions of CT imaging system 10 at the time of processing. Compression device 300 measures the calibration vectors periodically (e.g., at a particular time interval such as every hour, or after substantial temperature change) and stores the calibration vectors for reference during any subsequent de-compression process of the normalized image data. The normalization step may be reversible, such that, given the normalized image data and the calibration vectors, the compression device 300 may recover raw image data by de-compression.

Furthermore, compression device 300 is configured to requantize the normalized image data. In particular, compression device 300 performs requantization in the square root domain. Raw image data is typically quantized using one or more linear or nonlinear analog-to-digital (ADC) converters (not shown), such that output counts therefrom are proportional to the signal being captured by detector elements 28. The number of bits in the dynamic range of the ADC is typically chosen based on the required dynamic range of the detector element 28 and variation between a full flux and a minimum flux (which occurs in a CT imaging system 10 when X-rays generated by detector elements 28 pass through a maximally attenuating object). This data, in a polychromatic CT imaging system 10, may approximate a Poisson distribution. For example and without limitation, compression device 300 may transform the normalized, Poisson data into the square-root domain, and resulting data is Gaussian with a constant variance. This square-root transformed data is matched to a uniform quantizer that includes a step size chosen to be small relative to the variance of the transformed data. In other words, the requantization step is a range compression of the normalized data, and includes computing the square root of the normalized image data and requantizing that data to a suitable level of fidelity. Compression device 300 may include multiplication by a fixed constant as part of this requantization step and subsequently may round each value to the nearest integer. The number of bits allocated per processed luggage item depends on a desired constant that is chosen to balance a level of compression with an error induced during the requantization step. For example and without limitation, if the input raw data is generally 12-24 bits, then the square-root transformed data is typically 7-16 bits.

Compression device 300 is configured to perform empty column suppression on the resulting requantized image data. Because much of raw image data captured and transmitted from detector elements 28 does not include a scanned item, many of the columns in raw image data (and, therefore, the normalized data and the requantized data) include little to no information. In one embodiment, compression device 300 may perform this empty column suppression by summing the values in the columns of the requantized data. Compression device 300 compares the column sums to a threshold value, and for any column that has a corresponding column sum that is less than the threshold value, all of the values in that column are replaced with zero. Furthermore, compression device 300 stores a record of the values that are replaced with zero, such that the empty column suppression may be reversed in a de-compression process if desired. In some embodiments, compression device 300 may not perform empty column suppression on the requantized image data at all.

Compression device 300 also is configured to perform small value suppression on the requantized image data or empty column suppression data. Raw image data with values close to zero represent images captured close to air measurement (e.g., along an edge of a luggage item). In many cases, such values contain little to no useful information and may be discarded from the image data to further compress the image data. In one embodiment, compression device 300 performs small value suppression by comparing all values of the requantized image data (which may have also had empty column suppression performed thereon) to a threshold value. Compression device 300 replaces any value of the requantized image data that is less than the threshold value with zero. Compression device 300 may store a record of the values that are replaced with zero, such that the small value suppression may be reversed in a de-compression process. In some embodiments, compression device 300 may not perform any small value suppression on the requantized image data.

Moreover, compression device 300 is configured to group individual frames or "projections" from the requantized data, empty column suppression data, or small value suppression data into "groups of projections" (GOP) and delta encode each GOP. Each projection represents a single, 2D projection image taken by one or more of detector elements 28. Each GOP includes a first projection in a time series of projections and subsequent contiguous projections captured thereafter. The first projection in each GOP is encoded using spatial-delta encoding. In this step, the requantized image data of the first projection is processed along the columns thereof, and each row-value in the column is replaced with the difference between that row-value and the previous row-value in the same column. As a result, compression device 300 preserves the values in the first row of the first projection, and all values in subsequent rows are encoded as differences to those first-row values. Optionally, the first projection may be spatial-delta encoded along the rows by replacing the second value in the row with the difference between the first value in the first row and the second value in the row, etc. Alternative methods of spatial-delta encoding the first projection may be implemented, including compression device 300 spatial-delta encoding along the rows rather than the column, spatial-delta encoding from the bottom up, or spatial-delta encoding from the center out. The method of spatial-delta encoding that is employed may vary depending on the characteristics of detector elements 28. This step of spatial-delta encoding the first projection is generally lossless, and may be reversed in a de-compression process. Alternatively, a "zig-zag" encoding may be utilized in which the data is resequenced in a zig-zag pattern or manner.

Compression device 300 also is configured to temporal-delta encode the plurality of subsequent projections in the GOP. In one embodiment, each subsequent projection is temporal-delta encoded relative to the first projection in the GOP. In another embodiment, each subsequent projection is temporal-delta encoded relative to the previous projection. (i.e., the first subsequent projection is temporal-delta encoded relative to the first projection, the second subsequent projection is temporal-delta encoded relative to the first subsequent projection, etc.). In yet another embodiment, plurality of projections are temporal-delta encoded relative to one or more future projections. Specifically, each row-column value for a projection (e.g., each pixel) is temporal-delta encoded, or is replaced with the difference between that row-column value and the corresponding row-column value in the reference projection. In the example embodiment, this temporal-delta encoding is performed with respect to the first frame in a non-encoded state. For example, compression device 300 may store the first frame in a non-encoded state prior to spatial-delta encoding the first frame or may perform temporal-delta encoding of the plurality of subsequent frames prior to the spatial-delta encoding of the subsequent frames. This step of temporal-delta encoding the subsequent projections is generally lossless, and may be reversed in a de-compression process.

Furthermore, compression device 300 is configured to perform a mapping of signed values to unsigned values. After delta encoding each GOP, each projection is represented or encoded as delta-encoded image data. Accordingly, the values of the delta-encoded image data are "signed values" (e.g., positive or negative values). In some embodiments, compression device 300 is configured to implement Riesz encoding to map each signed value to an unsigned value. It should be understood that other "sign-wrapping" methods may be implemented, and this mapping step should not be construed to be limited to Riesz encoding. In the example embodiment, the Riesz encoding maps signed values to unsigned values without increasing an entropy of the data. In particular, in one embodiment, compression device 300 is configured to implement the following mapping:

$x=2x$ if $x \geq 0$, and $x=(-2x)-1$ if $x<0$.

This step of mapping the values in each projection is generally lossless, and may be reversed in a de-compression process.

Moreover, compression device 300 is configured to perform zero-column suppression on the sign-mapped GOPs. In utilizing zero-column suppression, compression device 300 does not encode any column (in the sign-mapped or sign-converted projections) that includes all zero row values. Rather, these columns are represented by a single bit indicating that the respective column is entirely zero row values. Compression device 300 represents non-zero columns by another single bit indicating that those respective columns have non-zero row values. These single bits are arranged into a one-dimensional bitmask that the compression device 300 may transmit at the beginning of each encoded projection. This step of performing zero-column suppression is generally lossless and may be reversed in a de-compression process. In some embodiments, compression device 300 may not perform zero column suppression on the sign-mapped GOPs.

Compression device 300 also is configured to perform entropy coding on the sign-mapped GOPs (which may, in some embodiments, have had zero-column suppression performed thereon). Furthermore, compression device 300 may perform entropy coding using any suitable entropy coding technique, for example and without limitation, Huffman coding, adaptive Huffman coding, arithmetic coding, or any other suitable technique. Compression device 300 may utilize different entropy coding techniques according to a balance of complexity and performance factors. In one embodiment, compression device 300 is configured to perform static Huffman coding with a dictionary built for each GOP. This step of entropy coding the GOPs is generally lossless and may be reversed in a de-compression process.

Moreover, compression device 300 is configured to packetize each entropy-coded GOP. In particular, compression device 300 formats each GOP into a packet for transmission and/or storage thereof. This step of packetizing the entropy-coded GOPs is generally lossless and may be reversed in a de-compression process.

The compression algorithm implemented by compression device 300, as described above, is configured to operate in real-time on received raw image data. While the compression algorithm is "lossy" in that some values of image data are discarded, the compression algorithm is configured such that the discarded data is redundant, unnecessary, and/or useless (for analysis of objects 18) data. As such, the compression algorithm performed by compression device 300 is configured to cause minimal degradation to image quality of received image data while providing a significant compression ratio. In addition, the compression device 300 performing this compression algorithm is configured to function without significant delay between receipt and transmission/storage of image data, without being computationally burdensome. Accordingly, CT imaging system 10 may be designed with less costly memory and processing elements due to the decreased system burden in image processing. Furthermore, the CT imaging system 10 includes a slip-ring (not shown) that allows the transmission of data across a moving joint of the gantry. This slip-ring includes a limited bandwidth such that transmitting data across this moving joint is expensive and difficult. Thus, compression device 300 thereby improves transmission speeds and storage capacity of CT imaging system 10 by compressing the data as described herein.

Figure 5:
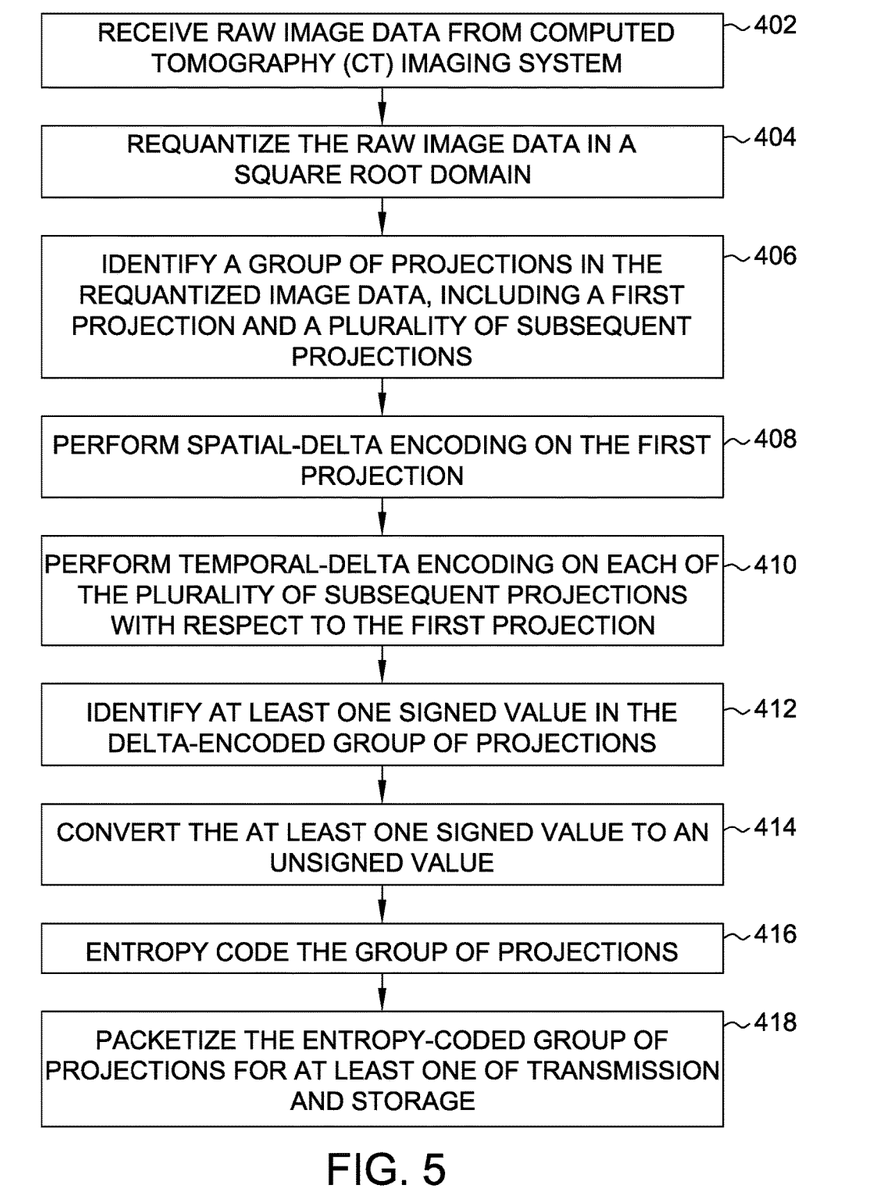
FIG. 5 is a schematic flowchart of an exemplary method of compressing image data from a CT imaging system as shown in FIG. 1.

FIG. 5 is an example method 400 for compressing image data generated by computed tomography (CT) imaging scanner 10 (shown in FIG. 1). In the example embodiment, method 400 is performed by a computing system such as compression device 300 (also shown in FIG. 1).

In the example embodiment, method 400 includes receiving 402 raw image data (e.g., raw image data, shown in FIG. 1) from CT imaging scanner 10. For example, compression device 300 may receive raw image data from one or more detector elements 28 (also shown in FIG. 1). Method 400 further includes requantizing 404 the raw image data in a square root domain. Method 400 also includes identifying 406 a group of projections in the requantized image data. The group of projections includes a first projection and a plurality of subsequent projections. Method 400 further includes performing spatial-delta encoding 408 on the first projection and performing temporal-delta encoding 410 on each of the plurality of subsequent projections with respect to the first projection (or alternatively, relative to the immediate previous projection or one or more future projections). Method 400 still further includes identifying 412 at least one signed value in the delta-encoded group of projections, as well as converting 414 the at least one signed value to an unsigned value. Method 400 also includes entropy coding 416 the sign-converted image data in the group of projections. Method 400 further includes packetizing 418 the entropy-coded group of projections for transmission and/or storage.

A computer, such as those described herein, includes at least one processor or processing unit and a system memory. The computer typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Exemplary embodiments of methods and systems are described above in detail. The methods and systems are not limited to the specific embodiments described herein, but rather, components of systems and/or steps of the methods may be used independently and separately from other components and/or steps described herein. Accordingly, the exemplary embodiment can be implemented and used in connection with many other applications not specifically described herein.

Technical effects of the systems and methods described herein include at least one of (a) decreasing processing requirements of a computed tomography (CT) imaging system by compressing the image data transmitted thereby in real-time; (b) decreasing storage or memory requirements of a CT imaging system by compressing the image data stored thereby in real-time; (c) providing a high level of real-time or low-delay image compression (6×-14×) without substantial degradation of image quality; and (d) implementing an image compression process that is reversible in a de-compression process.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose various embodiments, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A compression device for compressing raw image data generated by a computed tomography (CT) imaging system, said compression device including a processor coupled to a memory and to the CT imaging system, said compression device configured to compress the image data by:
   receiving raw image data from the CT imaging system;
   requantizing the raw image data in a square root domain;
   summing values in each column of the requantized image data;
   comparing the sums to a threshold value;
   for any column that has a sum less than the threshold value, replacing all values in that column with zero;
   identifying a group of projections in the requantized image data, including a first projection and a plurality of subsequent projections;
   performing spatial-delta encoding on the first projection;
   performing temporal-delta encoding on each of the plurality of subsequent projections with respect to at least one of the projections in the group of projections;
   identifying at least one signed value in the delta-encoded group of projections;
   converting the at least one signed value to an unsigned value;
   entropy coding the sign-converted image data in the group of projections; and
   packetizing the entropy-coded group of projections for at least one of transmission and storage.

2. The compression device of claim 1, further configured to compress the raw image data while the raw image data is being generated by the CT imaging system.

3. The compression device of claim 1 further configured to receive the raw image data by receiving multi-slice helical image data.

4. The compression device of claim 1 further configured to:
   compare at least one value in the requantized image data to a predefined threshold value;
   determine that the at least one value is less than the predefined threshold value; and
   in response to determining that the at least one value is less than the predefined threshold value, remove the at least one value from the requantized image data.

5. The compression device of claim 1 further configured to perform zero column suppression on the sign-converted group of projections by representing any column that includes all zero row values as a single bit indicating that the column is entirely zero row values.

6. The compression device of claim 1 further configured to:
   normalize the raw image data by linearizing the raw image of a detector in the CT imaging system and using at least two calibration vectors; and
   requantize the normalized image data in the square root domain.

7. A computer-implemented method for compressing raw image data generated by a computed tomography (CT) imaging system, said method implemented using a compression device including a processor coupled to a memory and to the CT imaging system, said method comprising:
   receiving raw image data from the CT imaging system;
   requantizing the raw image data in a square root domain;
   summing values in each column of the requantized image data;
   comparing the sums to a threshold value;
   for any column that has a sum less than the threshold value, replacing all values in that column with zero;
   identifying a group of projections in the requantized image data, including a first projection and a plurality of subsequent projections;
   performing spatial-delta encoding on the first projection;
   performing temporal-delta encoding on each of the plurality of subsequent projections with respect to at least one of the projections in the group of projections;
   identifying at least one signed value in the delta-encoded group of projections;
   converting the at least one signed value to an unsigned value;
   entropy coding the sign-converted image data in the group of projections; and
   packetizing the entropy-coded group of projections for at least one of transmission and storage.

8. The computer-implemented method of claim 7 further comprising compressing the raw image data while the raw image data is being generated by the CT imaging system.

9. The computer-implemented method of claim 7, wherein receiving the raw image data comprises receiving multi-slice helical image data.

10. The computer-implemented method of claim 7 further comprising:
    comparing at least one value in the requantized image data to a predefined threshold value;
    determining that the at least one value is less than the predefined threshold value; and
    in response to determining that the at least one value is less than the predefined threshold value, removing the at least one value from the requantized image data.

11. The computer-implemented method of claim 7 further comprising performing zero column suppression on the sign-converted group of projections by representing any column that includes all zero row values as a single bit indicating that the column is entirely zero row values.

12. The computer-implemented method of claim 7 further comprising:
    normalizing the raw image data by linearizing the raw image of a detector in the CT imaging system and using at least two calibration vectors; and
    requantizing the normalized image data in the square root domain.

13. At least one non-transitory computer-readable storage media having computer-executable instructions embodied thereon, wherein when executed by at least one processor, the computer-executable instructions cause the processor to:
    receive raw image data from the CT imaging system;
    requantize the raw image data in a square root domain;
    sum values in each column of the requantized image data;
    compare the sums to a threshold value;
    for any column that has a sum less than the threshold value, replace all values in that column with zero;
    identify a group of projections in the requantized image data, including a first projection and a plurality of subsequent projections;
    perform spatial-delta encoding on the first projection;

perform temporal-delta encoding on each of the plurality of subsequent projections with respect to at least one of the projections in the group of projections;

identify at least one signed value in the delta-encoded group of projections;

convert the at least one signed value to an unsigned value;

entropy code the sign-converted image data in the group of projections; and packetize the entropy-coded group of projections for at least one of transmission and storage.

14. At least one non-transitory computer-readable storage media in accordance with claim 13, wherein the computer-executable instructions further cause the processor to compress the raw image data while the raw image data is being generated by the CT imaging system.

15. At least one non-transitory computer-readable storage media in accordance with claim 13, wherein the computer-executable instructions further cause the processor to:

compare at least one value in the requantized image data to a predefined threshold value;

determine that the at least one value is less than the predefined threshold value; and in response to determining that the at least one value is less than the predefined threshold value, remove the at least one value from the requantized image data.

16. At least one non-transitory computer-readable storage media in accordance with claim 13, wherein the computer-executable instructions further cause the processor to perform zero column suppression on the sign-converted group of projections by representing any column that includes all zero row values as a single bit indicating that the column is entirely zero row values.

17. At least one non-transitory computer-readable storage media in accordance with claim 13, wherein the computer-executable instructions further cause the processor to:

normalize the raw image data by linearizing the raw image of a detector in the CT imaging system and using at least two calibration vectors; and requantize the normalized image data in the square root domain.

* * * * *